United States Patent [19]

Miller

[11] Patent Number: 4,689,138
[45] Date of Patent: Aug. 25, 1987

[54] CATALYTIC ISOMERIZATION PROCESS USING A SILICOALUMINOPHOSPHATE MOLECULAR SIEVE CONTAINING AN OCCLUDED GROUP VIII METAL THEREIN

[75] Inventor: Stephen J. Miller, San Francisco, Calif.

[73] Assignee: Chevron Research Company, San Francisco, Calif.

[21] Appl. No.: 782,837

[22] Filed: Oct. 2, 1985

[51] Int. Cl.$^4$ .................... C10G 47/02; C07C 5/13
[52] U.S. Cl. ................................ 208/111; 208/114; 585/740
[58] Field of Search ................. 585/740; 208/111, 114

[56] References Cited

U.S. PATENT DOCUMENTS 4,440,871 4/1984 Lok et al. ........................ 502/214

Primary Examiner—Curtis R. Davis
Attorney, Agent, or Firm—S. R. LaPaglia; T. G. DeJonghe; V. J. Cavalieri

[57] ABSTRACT

An isomerization process for lowering the normal paraffin content of a hydrocarbon oil feedstock by contacting the feedstock with a catalyst comprising an intermediate pore size silicoaluminophosphate molecular sieve and at least one Group VIII metal wherein the metal is occluded in the molecular sieve is described. The n-paraffins in the feedstock become isomerized to isoparaffins to form liquid range materials which contribute to a low viscosity, low pour point product in the case of middle distillate and lube oils and high octane in the case of gasoline.

10 Claims, 2 Drawing Figures

CATALYTIC ISOMERIZATION PROCESS USING A SILICOALUMINOPHOSPHATE MOLECULAR SIEVE CONTAINING AN OCCLUDED GROUP VIII METAL THEREIN

BACKGROUND OF THE INVENTION

1. Field of the Invention

This invention is concerned with an isomerization process for selectively lowering the normal paraffin content of a hydrocarbon oil. In particular, it is concerned with an isomerization process for lowering the normal paraffin content of a hydrocarbon oil feedstock by contacting the feedstock with a catalyst comprising an intermediate pore size silicoaluminophosphate molecular sieve and at least one Group VIII metal wherein said metal is occluded in the molecular sieve, i.e., the metal is added to the molecular sieve by coprecipitation of the sieve and metal components.

2. Description of the Prior Art

Shape-selective paraffin conversion of hydrocarbon oils is well known in the art and generally refers to the treatment of hydrocarbon feeds to reduce the normal paraffins therein. The normal paraffin components of hydrocarbon oils, particularly long chain normal paraffins, impart, for-many-roses, undesirable characteristics to the oils and hence must generally be removed, e.g., by catalytic dewaxing, in order to produce commercially useful products. In particular, middle-distillate and lube oil range hydrocarbon oils having high concentrations of normal paraffins, i.e., wax, generally have higher freeze points or pour points than oils having lower concentrations of normal paraffins. For many purposes it is desirable to have oils with low freeze points or pour points. Thus, for example, the lower the freeze point of a jet fuel, the more suitable it will be for operations under conditions of extreme cold. Thus; the fuel will remain liquid and flow freely without external heating even at very low temperatures. In the case of lubricating oils, it is desirable that the pour points be low, thereby enabling the oil to pour freely and adequately lubricate, even at low temperature.

The prior art shape-selective paraffin conversion processes, however, have the disadvantage of having substantial cracking, and undesirably crack some of the potentially valuable hydrocarbon feedstocks to low value light products such as hydrocarbon gases.

Prior art shape-selective paraffin conversion catalysts dealing with paraffin cracking generally comprise an aluminosilicate zeolite having a pore size which admits the straight chain n-paraffins either alone or with only slightly branched chain paraffins, but which excludes more highly branched materials, cycloaliphatics and aromatics. Zeolites such as ZSM-5, ZSM-11, ZSM-12, ZSM-23, ZSM-35 and ZSM-38 have been proposed for this purpose in shape-selective paraffin conversion processes and their use is described in U.S. Pat. Nos. 3,700,585; 3,894,938; 4,176,050; 4,181,598; 4,222,855; 4,229,282; 4,247,388; 3,849,290; 3,950,241; 4,032,431; and 4,141,859.

Since shape-selective paraffin conversion processes of this kind function by means of cracking reactions, a number of useful products become degraded to lower molecular weight materials. For example, waxy paraffins may be cracked down to butane, propane, ethane and methane and so may the lighter n-paraffins which do not, in any event, contribute to the waxy nature of the oil. Because these lighter products are generally of lower value than the higher molecular weight materials, it would obviously be desirable to limit the degree of cracking which takes place during a catalytic shape-selective conversion process.

Prior patents dealing with paraffin isomerization include U.S. Pat. No. 3,432,568 which describes hydroisomerization of saturated aliphatic and cyclic hydrocarbons by contacting with a mixed dual-functional catalyst comprising hydrogen mordenite and a dehydrogenation component supported on a thermally stable carrier. U.S. Pat. No. 3,301,917 relates to hydroisomerization of paraffinic hydrocarbons in the presence of a mixed catalyst consisting essentially of an acid aluminosilicate portion and a hydrogenation component of a platinum metal supported on a thermally stable carrier. U.S. Pat. No. 3,673,267 describes a process for isomerization of paraffinic hydrocarbons under isomerizing conditions and in the presence of hydrogen with a catalyst of hydrogen modenite having a silica to alumina mole ratio between about 20:1 and about 60:1, having associated therewith a metal of Group VIII, Group VIB or Group IB.

U.S. Pat. No. 4,419,220 discloses a process wherein hydrocarbon feedstocks are dewaxed by isomerizing the waxy component over a zeolite beta catalyst.

In isomerization processes, a principal problem is the attainment of high yield and selectivity of desired isomerates; and minimization of competing reactions is a consideration. A principal undersired competing reaction is cracking; and a common measure of effectivity of an isomerization catalyst is its ability to maximize isomerization while minimizing cracking.

An isomerization shape-selective paraffin conversion catalyst has now been found which effectively removes normal paraffins from a hydrocarbon oil feedstock by isomerizing them without substantial cracking. By use of certain silicoaluminophosphate molecular sieve catalysts which contain at least one Group VIII metal occluded therein, in the shape-selective conversion process, the normal paraffin content of hydrocarbon oil feedstocks may be effectively reduced wherein the products obtained are of higher molecular weight than those obtained using prior art aluminosilicate zeolites. The manner in which the Group VIII metal is associated with the silicoaluminophosphate is ccritical to obtaining the shape selective isomerization catalyst of this invention. The Group VIII metal is occluded within the pores of the silicoaluminophosphate by incorporating a water-soluble salt of the desired metal into the forming solution of the silicoaluminophosphate and then growing the silicoaluminophosphate crystals.

The catalyst used in the process of this invention is shape selective in that it isomerizes normal and slightly branched paraffins and does not essentially react with highly branched paraffins. Many of the prior art catalysts crack both the highly branched as well as the normal paraffins to lighter products and gases. Because these lighter products are generally of lower value than the higher molecular weight materials, it would obviously be desirable to limit the degree of cracking which takes place during the process.

SUMMARY OF THE INVENTION

In accordance with the present invention, there has been discovered an isomerization process for catalytically reducing the normal paraffin content of a hydrocarbon oil feedstock containing straight chain hydrocarbons which comprises contacting said oil feedstock with a catalyst comprising an intermediate pore size crystalline silicoaluminophosphate molecular sieve, and at least one Group VIII metal component which metal component is occluded in the molecular sieve and wherein said molecular sieve having resulted from the growth of crystals of said molecular sieve from an aqueous medium containing a water-soluble compound of said Group VIII metal.

Examples of the silicoaluminophosphate molecular sieves of the type used in the process of this invention are described in U.S. Pat. No. 4,440,871, which is incorporated totally herein by reference.

It has been found that the present process provides selective conversion of n-paraffins to branched paraffins. During processing the normal paraffins undergo isomerization reactions to yield iso-paraffin products with minor cracking reactions occurring. The n-paraffins become isomerized to iso-paraffins to form liquid range materials which contribute to a low viscosity, low pour point product in the case of middle distillate and lube oils, and high octane in the case of gasoline.

Because of the selectivity of the catalyst used in the process of this invention, cracking reactions which tend to increase gas yield are reduced, thereby preserving the economic value of the feedstock.

DESCRIPTION OF SPECIFIC EMBODIMENTS

Feedstock

The present process may be used to reduce the normal paraffin content of a variety of feedstocks ranging from relatively light distillate fractions up to high boiling stocks such as whole crude petroleum, reduced crudes, vacuum tower residua, cycle oils, synthetic crudes (e.g., shale oils, tar sand oil, etc.), gas oils, vacuum gas oils, foots oils, and other heavy oils. The process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits, and with lighter distillates containing normal paraffins such as straight run gasoline or gasoline range fractions from hydrocracking or reforming whose octanes need to be within certain limits. Hydrocracked stocks are a convenient source of lubricating oil stocks and also of other distillate fractions since they normally contain significant amounts of waxy n-paraffins. The feedstock of the present process will normally be a $C_5+$ feedstock containing paraffins, olefins, naphthenes, aromatics and heterocyclic compounds and with a substantial proportion of n-paraffins. During the processing, the n-paraffins undergo isomerization to iso-paraffins which are liquid range materials. The small degree of cracking which occurs is, however, limited so that the gas yield is reduced, thereby preserving the economic value of the feedstock.

While the process herein can be practiced with utility when the feed contains organic nitrogen (nitrogen-containing impurities), it is preferred that the organic nitrogen content of the feed be less than 50, more preferably less than 10, ppmw. Especially good results, in terms of activity and length of catalyst cycle (period between successive regenerations or start-up and first regeneration), are experienced when the feed contains less than 10 ppmw of organic nitrogen.

SILICOALUMINOPHOSPHATE CATALYSTS COMPOSITIONS (SAPOs)

Silicoaluminophosphate molecular sieves (SAPOs) suitable for use in the instant process comprise any molecular sieve having a silicoaluminophosphate molecular framework which has an intermediate pore size and which comprises a molecular framework of corner-sharing [$SiO_2$] tetrahedra, [$AlO_2$] tetrahedra and [$PO_2$] tetrahedra, [i.e., $(Si_xAl_yP_z)O_2$ tetrahedral units], and which functions to convert at effective process conditions the aforementioned feedstock to products of reduced normal paraffin content and includes those silicoaluminophosphate molecular sieves described in U.S. Pat. No. 4,440,871 which is incorporated herein by reference.

Figure 1:
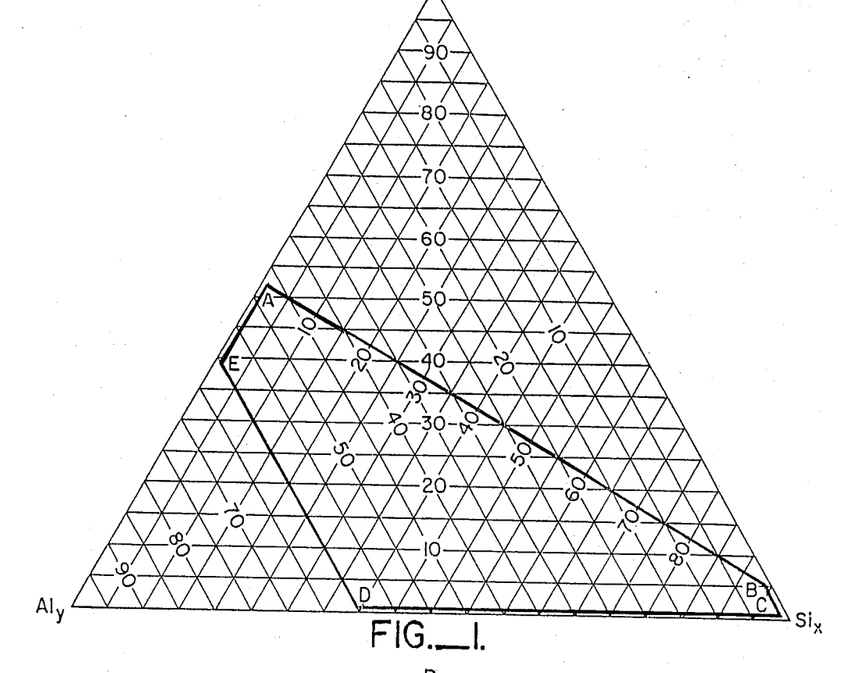
FIG. 1 is a ternary diagram showing the compositional parameters of the silicoaluminophosphates of U.S. Pat. No. 4,440,871 in terms of mole fractions of silicon, aluminum and phosphorus.

The preferred intermediate pore size SAPOs are characterized as comprising a three-dimensional microporous crystal framework structure of [$SiO_2^-$], [$AlO_2^-$] and [$PO_2$] tetrahedral units which has a unit empirical formula on a anhydrous basis of:

$$mR: (Si_xAl_yP_z)O_2$$

wherein "R" represents at least one organic templating agent (hereinafter also referred to as "template") present in the intracrystalline pore system; "m" represents the moles of "R" present per mole of $(Si_xAl_yP_z)O_2$ and has a value from zero (0) to about 0.3, with the maximum value of m being related at least in part, to the molecular dimensions of the template and the void volume of the intracrystalline pore system of the particular SAPO; "x", "y" and "z" represent the mole fractions of silicon, aluminum and phosphorus, respectively, present as tetrahedral oxide units, said mole fractions being within the pentagonal compositional area defined by points A, B, C, D and E of the ternary compositional diagram depicted by FIG. 1 of the drawings where the points A, B, C, D and E are represented by the following values for "x", "y" and "z":

| Point | Mole Fraction | | |
|---|---|---|---|
| | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

Figure 2:
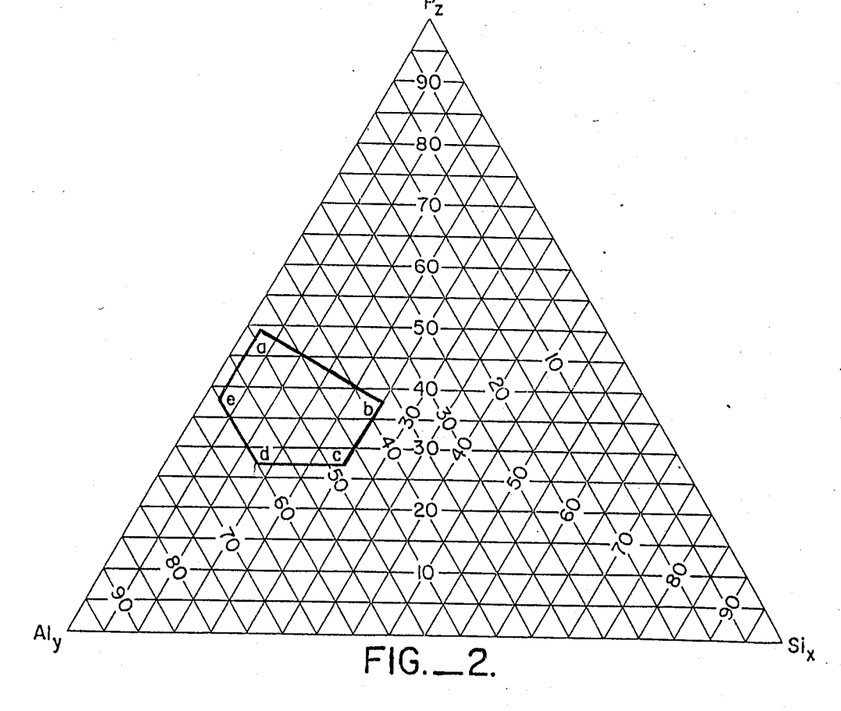
FIG. 2 is a ternary diagram showing the preferred compositional parameters of the silicoaluminophosphates of mole fractions of silicon, aluminum and phosphorus.

A preferred sub-class of the SAPOs of Formula (1), above, have a minimum value of "m" of 0.02 in the assynthesized form and have the values of "x", "y", and "z" within the pentagonal compositional area defined by the points a, b, c, d, and e of the ternary diagram which is FIG. 2 of the drawings, wherein said points a, b, c, d, and e are represented by the following values of "x", "y" and "z":

| Point | Mole Fraction | | |
|---|---|---|---|
| | x | y | z |
| a | 0.02 | 0.49 | 0.49 |
| b | 0.25 | 0.37 | 0.38 |
| c | 0.25 | 0.48 | 0.27 |
| d | 0.13 | 0.60 | 0.27 |
| e | 0.02 | 0.60 | 0.38 |

The term "unit empirical formula" is used herein according to its common meaning to designate the simplest formula which gives the relative number of atoms of silicon, aluminum and phosphorus which form a $[PO_2]$, $[AlO_2]$ and $[SiO_2]$ tetrahedral unit within a silicoaluminophosphate molecular sieve and which forms the molecular framework of the SAPO composition(s). The unit empirical formula is given in terms of silicon, aluminum and phosphorus as shown in Formula (1), above, and does not include other compounds, cations or anions which may be present as a result of the SAPO's preparation or the existence of other impurities or materials in the bulk composition not containing the aforementioned tetrahedral unit as the molecular framework. The amount of template R is reported as part of the composition when the assynthesized unit empirical formula is given, and water may also be reported unless such is defined as the anhydrous form. For convenience, coefficient "m" for template "R" is reported as a value that is normalized by dividing the number of moles of R by the total number of moles of silicon, phosphorus and aluminum. When moles of water are reported the moles of water relative to the mole fractions of silicon, aluminum and phosphorus is reported as a value that is normalized by dividing the number of moles of water by the total moles of silicon, phosphorus and aluminum. The values of x, y and z are determined by dividing the number of moles of silicon, aluminum and phosphorus individually by the total number of moles of silicon, aluminum and phosphorus.

The unit empirical formula for a SAPO may be given on an "as-synthesized" basis or may be given after an "as-synthesized" SAPO composition has been subjected to some post treatment process, e.g., calcined. The term "as-synthesized" herein shall be used to refer to the SAPO composition(s) formed as a result of the hydrothermal crystallization but before the SAPO composition has been subjected to post treatment to remove any volatile components present therein. The actual value of "m" for a post-treated SAPO will depend on several factors (including: the particular SAPO, template, severity of the post-treatment in terms of its ability to remove the template from the SAPO, the proposed application of the SAPO composition, and etc.) and the value for "m" can be within the range of values as defined for the as-synthesized SAPO compositions although such is generally less than the as-synthesized SAPO unless such post-treatment process adds template to the SAPO so treated. A SAPO composition which is in the calcined or other post-treated form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., and preferably between 100° C. and 250° C., until crystals of the silicoaluminophosphate product are obtained, usually for a period of from 2 hours to 2 weeks. While not essential to the synthesis of SAPO compositions, it has been found that in general stirring or other moderate agitation of the reaction mixture and/or seeding the reaction mixture with seed crystals of either the SAPO to be produced, or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed SAPO and may be removed by a post-treatment process, such as by calcining the SAPO at temperatures of between about 200° C. and to about 700° C. so as to thermally degrade the template or by employing some other post-treatment process for removal of at least part of the template from the SAPO. In some instances the pores of the SAPO are sufficiently large to permit transport of the template, and, accordingly, complete or partial removal thereof can be accomplished by conventional desorption procedures such as carried out in the case of zeolites.

The SAPOs are preferably formed from a reaction mixture having a mole fraction of alkali metal cation which is sufficiently low that it does not interfere with the formation of the SAPO composition. Although the SAPO compositions will form if alkali metal cation are present, such reaction mixtures are not generally preferred. A reaction mixture, expressed in terms of molar oxide ratios, having the following bulk composition is preferred:

$$aR_2O:(Si_xAl_yP_z)O_2:bH_2O$$

wherein "R" is a template; "a" has a value great enough to constitute an effective concentration of "R" and is within the range of from greater than zero (0) to about 3; "b" has a value of from zero to 500; "x", "y" and "z" represent the mole fractions, respectively of silicon, aluminum and phosphorus wherein x, y and z each have a value of at least 0.01. The reaction mixture is preferably formed by combining at least a portion of the reactive aluminum and phosphorus sources in the substantial absence of the silicon source and thereafter combining the resulting reaction mixture comprising the aluminum and phosphorus sources with the silicon source. When the SAPOs are synthesized by this method the value of "m" in Formula (1) is generally above about 0.02.

Though the presence of alkali metal cations are not preferred, when they are present in the reaction mixture it is preferred to first admix at least a portion of each of the aluminum and phosphorus sources in the substantial absence of the silicon source. This procedure avoids adding the phosphorus source to a highly basic reaction mixture containing the silicon and aluminum source.

The reaction mixture from which these SAPOs are formed contain one or more organic templating agents (templates) which can be most any of those heretofore proposed for use in the synthesis of aluminosilicates. The template preferably contains at least one element of Group VA of the Periodic Table, particularly nitrogen, phosphorus, arsenic and/or antimony, more preferably nitrogen or phosphorus and most preferably nitrogen. The template contains at least one alkyl, aryl, araalkyl, or alkylaryl group. The template preferably contains from 1 to 8 carbon atoms, although more than eight carbon atoms may be present in the template. Nitrogen-containing templates are preferred, including amines and quaternary ammonium compounds, the latter being represented generally by the formula $R'_4N+$ wherein each $R'$ is an alkyl, aryl, alkylaryl, or araalkyl group; wherein $R'$ preferably contains from 1 to 8 carbon atoms or higher when $R'$ is alkyl and greater than 6 carbon atoms when $R'$ is otherwise, as hereinbefore discussed. Polymeric quaternary ammonium salts such as $[(C_{14}H_{32}N_2)(OH)_2]_x$ wherein "x" has a value of at least 2 may also be employed. The mono-, di- and tri-amines, including mixed amines, may also be employed as templates either alone or in combination with a quaternary ammonium compound or another template.

Representative templates, phosphorus, aluminum and silicon sources as well as detailed process conditions are more fully described in U.S. Pat. No. 4,440,871, which is incorporated totally herein by reference.

By "intermediate pore size", as used herein, is meant an effective pore aperture in the range of about 5.3 to 6.5 Angstroms when the molecular sieve is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves*, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), hexamethylbenzene (7.1), and tributylamine (8.1).

The preferred effective pore size range is from about 5.5 to about 6.2 Angstroms.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

The preferred intermediate pore size silico-aluminophosphate molecular sieves which are useful in the process of this invention include SAPO-11, SAPO-31 and SAPO-41 and are described in U.S. Pat. No. 4,440,871, which is incorporated herein by reference.

More specifically, SAPO-11, as referred to herein, comprises a silicoaluminophosphate material having a three-dimensional microporous crystal framework structure of $[PO_2]$, $[AlO_2]$ and $[SiO_2]$ tetrahedral units whose unit empirical formula on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value from zero to about 0.3, "x", "y" and "z" represent respectively, the mole fractions of silicon, aluminum and phosphorus, said mole fractions being within the compositional area bounded by points A, B, C, D and E on the ternary diagram which is FIG. 1 or preferably within the area bounded by points a, b, c, d and e on the ternary diagram which is FIG. 2, and said silicoaluminophosphate having a characteristic X-ray powder diffraction pattern which contains at least the d-spacings (as-synthesized and calcined) set forth below in Table I. When SAPO-11 is in the as-synthesized form "m" preferably has a value of from 0.02 to 0.3

TABLE I

| $2\Theta$ | | d | Relative Intensity |
|---|---|---|---|
| 9.4–9.65 | | 9.41–9.17 | m |
| 20.3–20.6 | | 4.37–4.31 | m |
| 21.0–21.3 | | 4.23–4.17 | vs |
| 22.1–22.35 | | 4.02–3.99 | m |
| 22.5–22.9 | (doublet) | 3.95–3.92 | m |
| 23.15–23.35 | | 3.84–3.81 | m–s |

All of the as-synthesized SAPO-11 compositions for which X-ray powder diffraction data which have been obtained to data have patterns which are within the generalized pattern of the table II below.

TABLE II

| $2\Theta$ | | d | $100 \times I/I_o$ |
|---|---|---|---|
| 8.05–8.3 | | 10.98–10.65 | 20–42 |
| 9.4–9.65 | | 9.41–9.17 | 36–58 |
| 13.1–13.4 | | 6.76–6.61 | 12–16 |
| 15.6–15.85 | | 5.68–5.59 | 23–38 |
| 16.2–16.4 | | 5.47–5.40 | 3–5 |
| 18.95–19.2 | | 4.68–4.62 | 5–6 |
| 20.3–20.6 | | 4.37–4.31 | 36–49 |
| 21.0–21.3 | | 4.23–4.17 | 100 |
| 22.1–22.35 | | 4.02–3.99 | 47–59 |
| 22.5–22.9 | (doublet) | 3.95–3.92 | 55–60 |

TABLE II-continued

| 2Θ | | d | 100 × I/I$_o$ |
|---|---|---|---|
| 23.15–23.35 | | 3.84–3.81 | 64–74 |
| 24.5–24.9 | (doublet) | 3.63–3.58 | 7–10 |
| 26.4–26.8 | (doublet) | 3.38–3.33 | 11–19 |
| 27.2–27.3 | | 3.28–3.27 | 0–1 |
| 28.3–28.5 | (shoulder) | 3.15–3.13 | 11–17 |
| 28.6–28.85 | | 3.121–3.094 | |
| 29.0–29.2 | | 3.079–3.058 | 0–3 |
| 29.45–29.65 | | 3.033–3.013 | 5–7 |
| 31.45–31.7 | | 2.846–2.823 | 7–9 |
| 32.8–33.1 | | 2.730–2.706 | 11–14 |
| 34.1–34.4 | | 2.629–2.607 | 7–9 |
| 35.7–36.0 | | 2.515–2.495 | 0–3 |
| 36.3–36.7 | | 2.475–2.449 | 3–4 |
| 37.5–38.0 | (doublet) | 2.398–2.368 | 10–13 |
| 39.3–39.55 | | 2.292–2.279 | 2–3 |
| 40.3 | | 2.238 | 0–2 |
| 42.2–42.4 | | 2.141–2.132 | 0–2 |
| 42.8–43.1 | | 2.113–2.099 | 3–6 |
| 44.8–45.2 | (doublet) | 2.023–2.006 | 3–5 |
| 45.9–46.1 | | 1.977–1.969 | 0–2 |
| 46.8–47.1 | | 1.941–1.929 | 0–1 |
| 48.7–49.0 | | 1.870–1.859 | 2–3 |
| 50.5–50.8 | | 1.807–1.797 | 3–4 |
| 54.6–54.8 | | 1.681–1.675 | 2–3 |
| 55.4–55.7 | | 1.658–1.650 | 0–2 |

SAPO-31, as referred to herein, comprises a silicoaluminophosphate having a three-dimensional microporous crystal framework of [PO$_2$], [AlO$_2$] and [SiO$_2$] tetrahedral units whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram which is FIG. 1, or preferably within the area bounded by points a, b, c, d and e on the ternary diagram which is FIG. 2, said silicoaluminophosphate having a characteristic X-ray powder diffraction pattern (as-synthesized and calcined) which contains at least the d-spacings set forth below in Table III. When SAPO-31 is in the as-synthesized form "m" preferably has a value of from 0.02 to 0.3.

TABLE III

| 2Θ | d | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

All of the as-synthesized SAPO-31 compositions for which X-ray powder diffraction data have presently been obtained have patterns which are within the generalized pattern of Table IV below.

TABLE IV

| 2Θ | d | 100 × I/I$_o$ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |

TABLE IV-continued

| 2Θ | d | 100 × I/I$_o$ |
|---|---|---|
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.873–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity

SAPO-41, as referred to herein, comprises a silicoaluminophosphate having a three-dimensional microporous crystal framework structure of [PO$_2$], [AlO$_2$] and [SiO$_2$] tetrahedral units, and whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "Y" and "z" represent respectively, the mole fractions of silicon, aluminum and phosphorus, said mole fractions being within the compositional area bounded by points A, B, C, D and E on the ternary diagram which is FIG. 1, or preferably within the area bounded by points a, b, c, d and e on the ternary diagram which is FIG. 2, said silicoaluminophosphate having a characteristic X-ray powder diffraction pattern (as-synthesized and calcined) which contains at least the d-spacings set forth below in Table V. When SAPO-41 is in the as-synthesized form "m" preferably has a value of from 0.02 to 0.3.

TABLE V

| 2Θ | d | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

All of the as-synthesized SAPO-41 compositions for which X-ray powder diffraction data have presently been obtained have patterns which are within the generalized pattern of Table VI below.

TABLE VI

| 2Θ | d | 100 × I/I$_o$ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The manner in which the Group VIII metal component is introduced into the crystalline silicoaluminophosphate molecular sieve is critical to the shape-elective isomerization process of the instant invention. The catalyst composition is made up of an intermediate pore size crystalline silicoaluminophosphate molecular sieve which molecular sieve contains occluded therein a Group VIII metal or ions of such metal, which metal is capable of forming a water-soluble compound of the metal. The Group VIII metal is occluded within the pores of the molecular sieve by incorporating a water-soluble salt of the desired metal into the forming solution of the molecular sieve and then growing the silicoaluminophosphate molecular sieve crystals. Examples of suitable salts include the nitrate, the chloride, the tetraamine nitrate, etc. The resulting wet metal-containing crystalline sieve is thereafter dried and subjected to a thermal treatment, preferably by initially heating in air, and thereafter in hydrogen. The finished catalyst is dry, and contains the Group VIII metal component distributed in the molecular sieve structure and preferably a substantial amount of which is in metallic form.

The products of this invention should not be confused with crystals to which catalytic elements are added after crystallization.

More specifically, the catalytic compositions of the invention are prepared by introducing a water-soluble metal compound into a molecular sieve-forming reaction mixture prior to crystallization of the molecular sieve product and thereafter inducing crystallization of the molecular sieve by subjecting the reaction mixture to hydrothermal treatment, and dehydrating the resulting product. Desirably thereafter such product is subjected to thermal treatment at a temperature in the approximate range of 250° F. to 1100° F. to effect at least partial conversion of the metal content to a catalytically active state.

Introduction of the metal compound to the molecular sieve-forming reaction mixture may be made by the addition of such compound to one of the reactants used in preparation of the forming mixture. Alternatively, the metal compound may be introduced by addition to the already formed molecular sieve reaction mixture, either before or after precipitation of the amorphous slurry. It is, however, essential that the metal compound be present in the reaction mixture before crystallization of the molecular sieve takes place in order that crystals of the molecular sieve may grow in the presence of the metal compound. It is contemplated that the specific reagents, amounts and concentrations for the aluminous, phosphorus and siliceous salts and other reagents used in preparation of the crystalline silicoaluminophosphate molecular sieve employed herein are the same as those heretofore conventionally employed for the preparation of the above-described molecular sieves in the absence of a metal compound. Likewise, the conditions for inducing crystallization of the resulting initially formed amorphous precipitate are contemplated to be the same as those heretofore employed for preparation of the crystalline molecular sieve in the absence of metal compound.

The preferred Group VIII metal is a metal of the platinum series, e.g., platinum, palladium, iridium, rhodium, ruthenium, or osmium. Of this group platinum and palladium are accorded preference. Each of the Group VIII metals may occur in a variety of compounds. The compounds of the useful platinum metals may be subdivided into compounds in which the metal is present in the neutral state, compounds in which the metal is present in the cation of the compound and compounds in which it is present in the anion of the compound. All of the foregoing types of compounds, that is types which contain the metal in the neutral, cationic or anionic state may be used. It is, however, a preferred aspect of the method of the invention to employ ionizable platinum metal compounds in which the metal is in the cationic state, i.e., in the form of a cation or cation complex, since the catalyst products prepared with the use of such compounds and particularly compounds in which platinum metal is present in divalent cationic form, exhibited marked catalytic selectivity. Thus, suitable metal compounds of the platinum series include:

It is contemplated that water will ordinarily be the solvent for the metal compound used. The concentration of the metal compound in the solution employed may vary widely depending upon the amount of metal and/or metal ions desired in the final composition and on the conditions under which crystallization is effected. An amount of metal compound introduced into the molecular sieve-forming mixture, however, is generally such that the ultimate crystalline molecular sieve contain therein an amount of metal and/or metal ions, expressed in terms of metal, from about 0.01 percent to about 10 percent by weight, and more usually between about 0.1 percent and about 5 percent by weight.

After the contact period, the resulting crystalline molecular sieve containing metal and/or metal ions therein is removed from the forming solution and washed with water. The resulting material is then dried, generally in air, to remove substantially all of the water therefrom.

The dried material may be desirably subjected to an activating treatment to render the final composition catalytically active. Such treatment involves heating the dried material at a temperature in the approximate range of 250° F. to 1100° F. to effect at least partial conversion of the metal content to a catalytically active state. In a preferred aspect of the invention, the dried material is subjected to treatment in an atmosphere containing free oxygen, such as air, at a temperature within the approximate range of 250° F. to 1100° F. for from about ¼ hour to 24 hours and thereafter in an atmosphere of hydrogen at a temperature within the above range to effect at least partial reduction of metal-containing ion to free metal.

The Group VIII metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elemental state or in some form such as the oxide or sulfide as mentioned above, and regardless of the state in which the metallic component actually exists the concentrations are computed as if they existed in the elemental state.

Also, any alkali metal cations which may be present in the as synthesized molecular sieve hereby prepared can be replaced, if desired, in accordance with techniques well known in the art, at least in part, by ion exchange with other cations. Preferred replacing cations include metal ions, ammonium ions, hydrogen ions and mixtures thereof. Particularly preferred cations include hydrogen and metals of Groups IIA, IVA, IB, IIB, IIIB, VIB and VIIB of the Periodic Table.

Of the replacing metallic cations, particular preference is given to cations of metals such as, for example, rare earth, Mn, Ca, Mg, Zn, Cd, Cu, Sn, and Ag.

Typical ion exchange technique would be to contact the zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

The physical form of the silicoaluminophosphate catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

Process Conditions

The isomerization step of this invention may be conducted by contacting the feed to be isomerized with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. The catalytic isomerization conditions are dependent in large measure on the feed used and upon the desired product properties. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be form 0.1 to 20, preferably between about 0.2 and about 10.

Hydrogen is preferably present in the reaction zone during the isomerization process. The hydrogen to feed ratios is typically between about 500 and about 30,000 SCF/bbl (standard cubic feet per barrel), preferably about 1000 to about 20,000 SCF/bbl. Generally, hydrogen will be separated from the product and recycled to the reaction zone.

The silicoaluminophosphate molecular sieve catalyst can be manufactured into a wide variety of physical forms. Generally speaking, the molecular sieve catalyst can be in the form of a powder, a granule, or a molded product, such as extrudate having particle size sufficient to pass through a 2-mesh (Tyler) screen and be retained on a 40-mesh (Tyler) screen. In cases where the catalyst is molded, such as by extrusion with a binder, the silicoaluminophosphate can be extruded before drying, or, dried or partially dried and then extruded.

The molecular sieve catalyst can be composited with other materials resistant to the temperatures and other conditions employed in the isomerization process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the isomerization process so that products can be obtained economically without employing other means for controlling the rate of reaction. The silicoaluminophosphate catalyst may be incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the silicoaluminophosphate catalyst include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the silicoaluminophosphate catalyst can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The silicoaluminophosphate catalysts used in the process of this invention can also be composited with zeolites such as synthetic and natural faujasites, (e.g., X and Y) erionites, and mordenites. They can also be composited with purely synthetic zeolites such as those of the ZSM series. The combination of zeolites can also be composited in a porous inorganic matrix.

The improved process of this invention will now be illustrated by examples which are not to be construed as limiting the invention as described in this specification including the attached claims.

EXAMPLES

Example 1

Pt-occluded SAPO-11 was prepared as follows:

57.8 g of 85 wt % $H_3PO_4$ was mixed with 30.0 g of distilled water. Into this was dissolved 0.8 g $Pt(NH_3)_4(NO_3)_2$. This mixture was slowly combined with 102.1 g aluminum isopropoxide in a beaker kept in an ice bath, and well mixed using a Polytron mixer. Next, 26.1 g Ludox AS-30(aqueous solution of 30 wt % $SiO_2$) plus 4.0 g water were added and well mixed. Then 22.8 g di-n-propylamine were added and the mixture again well stirred. The mixture was kept for 5 days at autogenous pressure and 165° C. in a stainless steel pressure vessel with a Teflon insert. The solid product was filtered, washed with water, dried overnight at 127° C., and calcined in air for 6 hours at 538° C. X-ray diffraction analysis identified the product as SAPO-11, disclosed in U.S. Pat. No. 4,440,871. Chemical analysis showed the sieve to have the following anhydrous molar composition:

$0.13SiO_2:Al_2O_3:P_2O_5$.

The Pt level was 0.6 wt %.

The sieve was bound with 35 wt % Catapal alumina, extruded through a 1/16" die, dried, and then calcined at 538° C. for 8 hours.

Example 2

A Pt-impregnated SAPO-11 was prepared according to example 1, except that instead of adding Pt to the synthesis mix, it was added to the calcined extrudate by the pore-fill method. The catalyst was dried and then calcined for 8 hour at 538° C. Chemical analysis of the sieve showed it to have the following anhydrous molar composititon:

$0.2SiO_2:Al_2O_3:P_2O_5$.

the Pt level of the catalyst was 0.9 wt %.

EXAMPLE 3-5

For comparison with the catalysts of this invention, the following catalysts were prepared:

Example 3

0.4 wt % Pt impregnated on a 1:2 weight ratio amorphous $SiO_2$-$Al_2O_3$ base made by cogellation.

Example 4

1.0 wt % Pt impregnated on H-silicalite of 650 $SiO_2$/$Al_2O_3$ mole ratio.

Example 5

0.8 wt % Pt impregnated on a 65/35 HZSM-5/alumina extrudate. The $SiO_2$/$Al_2O_3$ mole ratio of the sieve was 80.

Example 6

A Pd-occluded SAPO-11 was prepared similarly to Example 1, using 1.2 g of $Pd(NH_3)_4(NO_3)_2$. The anhydrous molar composition of the sieve was $0.5 SiO_2:Al_2O_3: 0.94P_2O_5$. The Pd content of the sieve was 0.6 wt %.

Example 7

A Nioccluded SAPO-11 was prepared similarly to Example 1, using 3.0 g $Ni(NO_3)_2.6H_2O$. The anhydrous molar composition of the sieve was $0.2SiO_2:Al_2O_3:P_2O_5$. The Ni content of the sieve was 0.7 wt %.

Example 8

The catalysts of Example 1-7 were tested for conversion of n-octane in a 50/50 (by weight) mixture of n-octane and 2,2,4-trimethylpentane to evaluate these catalysts for shape-selective isomerization.

Reaction conditions were 1000 psig, 2.8 WHSV over the sieve component, and $16H_2$/HC. The reactor temperature was adjusted to give a $n$-$C_8$ conversion of about 40%, except for the catalysts of Examples 3 and 7 which had low activity. Prior to introducing feed, the catalysts were calcined for one hour in air at 800° F., then presulfided in 1% $H_2S$ in $H_2$ for 30 minutes at 600° F.

The results, given in Table I, show that the occluded Pt and Pd SAPO-11 catalysts had surprisingly high selectivity for isomerizing the normal paraffin while leaving the highly branched paraffin unconverted.

TABLE I

| | Conversion of 50/50 (by weight) 2,2,4-Trimethylpentane/ Normal Octane at 1000 psig, 2.8 WHSV (over sieve), and $16H_2$/HC | | | | |
|---|---|---|---|---|---|
| Catalyst | Temperature, °F. | $nC_8$ Conversion, % | 2,2,4-tm $C_5$ Conversion % | Conversion of $nC_8$ to iso-$C_8$, % | SSI Selectivity, % |
| Example 1 | 710 | 38.3 | 4.0 | 26.4 | 58.5 |
| Example 2 | 675 | 36.8 | 20.1 | 34.0 | 37.8 |
| Example 3 | 700 | 28.0 | 94.3 | 27.0 | <0 |
| Example 4 | 670 | 47.6 | 3.2 | 20.9 | 37.2 |
| Example 5 | 500 | 46.0 | 1.0 | 21.2 | 43.9 |
| Example 6 | 650 | 38.9 | 9.9 | 37.8 | 71.7 |
| Example 7 | 700 | 24.6 | 2.2 | 5.4 | 13.0 |

Shape-Selective Isomerization (SSI) Selectivity, % = 100 × (Percent Conversion $nC_8$ to iso-$C_8$ - Percent Conversion 2,2,4tm $C_5$)/$nC_8$ Percent Conversion

Example 9

The catalyst of Example 1 was tested for dewaxing a +75° F. pour point lube oil. Inspections of the oil are given in Table II. Run conditions werb 1 LHSV, 2200 psig, and 8M SCF/bbl once-through $H_2$. A comparison run was made at the same conditions using $HZSM_5$ bound with 35% Catapal alumina. Results at +15° F. pour point are given in Table III, showing an advantage for the Pt/SAPO-11 catalyst versus the conventional ZSM catalyst.

TABLE II

+75° F. Pour Point Lube Oil

| | |
|---|---|
| Gravity, °API | 33.9 |
| Aniline Point, °F. | 216.6 |
| Sulfur, ppm | 1.3 |
| Nitrogen, ppm | 0.3 |
| Pour Point, °F. | +75 |
| Viscosity, cS, 100° C. | 3.610 |
| P/N/A/S, LV % | 27.6/61.6/10.8/0 |
| Simulated Distillation, LV %, °F. | |
| St/5 | 347/641 |
| 10/30 | 671/725 |
| 50 | 759 |
| 70/90 | 788/824 |
| 95/EP | 839/866 |

TABLE III

Inspections of +75° F. Pour Point Lube Oil Dewaxed at 1 LHSV, 2200 psig, and 8M SCF/bbl H$_2$

| Catalyst | Example 1 | HZSM-5 |
|---|---|---|
| Temperature, °F. | 675 | 606 |
| Pour Point, °F. | +15 | +20 |
| Lube Yield, Wt %* | 93 | 87 |
| Viscosity, cs, | | |
| 40° C. | 16.66 | 17.33 |
| 100° C. | 3.665 | 3.729 |
| Viscosity Index | 104 | 101 |

$$*\text{Lube yield} = \left(1 - \frac{g\ 700°\ F.+ \text{(feed)} - g\ 700°\ F.+ \text{(product)}}{g\ 700°\ F.+ \text{(feed)}}\right) \times 100\%$$

What is claimed is:

1. An isomerization process of catalytically reducing the normal paraffin content of a hydrocarbon oil feedstock containing straight chain hydrocarbons which comprises contacting said oil feedstock with a catalyst comprising an intermediate pore size crystalline silicoaluminophosphate molecular sieve, and at least one platinum or palladium metal component which metal component is occluded in the molecular sieve and wherein said molecular sieve having resulted from the growth of crystals of said molecular sieve from an aqueous medium containing a water-soluble compound of said platinum or palladium metal.

2. The method of claim 1 wherein the silicoaluminophosphate molecular sieve has a pore size in the range of from about 5.5 to 6.2 Å.

3. The method of claim 1 wherein the silicoaluminophosphate molecular sieve is selected from the group consisting of SAPO-11, and SAPO-41.

4. The method of claim 3 wherein the silicoaluminophosphate is SAPO-11.

5. The method of claim 1 wherein the platinum or palladium is present in the range of 0.01% to 10% based on the weight of molecular sieve.

6. The process of claim 1 wherein said process is conducted at a temperature of from about 200° C. to 475° C., a pressure of about 15 psig to about 3000 psig, a liquid hourly space velocity of from about 0.1 hr$^{-1}$ to about 20 hr$^{-1}$, a hydrogen circulation rate of from 500 to about 30,000 SCF/bbl.

7. The process of claim 1 wherein the feedstock is a middle distillate oil.

8. The process of claim 1 wherein the feedstock is a lube oil.

9. The process of claim 1 wherein the feedstock contains less than 50 ppm of nitrogen.

10. The process of claim 1 wherein the feedstock contains less than 10 ppm of nitrogen.

* * * * *